Sept. 2, 1941.  W. LAUBENHEIMER ET AL  2,254,899
SYSTEM FOR MAINTAINING CONSTANT ROTATIONAL SPEED OF ELECTRIC MACHINES
Filed Dec. 17, 1938

WITNESSES:
James F. Young
William J. Kuano

INVENTORS
Wilhelm Laubenheimer and
Oskar Schmutz
BY
Paul E. Friedemann
ATTORNEY

Patented Sept. 2, 1941

2,254,899

UNITED STATES PATENT OFFICE 2,254,899

SYSTEM FOR MAINTAINING CONSTANT ROTATIONAL SPEED OF ELECTRIC MACHINES

Wilhelm Laubenheimer, Halle-on-the-Saale, and Oskar Schmutz, Berlin-Haselhorst, Germany, assignors to Westinghouse Electric & Manufacturing Company, East Pittsburgh, Pa., a corporation of Pennsylvania Application December 17, 1938, Serial No. 246,420
In Germany December 23, 1937

3 Claims. (Cl. 172—239)

Our invention relates to a speed control system for an electric rotating machine such as, for example, a motor.

Systems which serve for maintaining the rotational speed of electric machines constant should, as far as possible, be free of maintenance necessities, and free of readily wearing parts, particularly when they are to be used under severe operating conditions. These requirements are fulfilled by a system embodying our invention.

In accordance with our invention, an auxiliary direct current depending on the frequency of an electric machine, such as, for example, a motor, the rotational speed of which is to be regulated, is used to influence the excitation of the machine. The auxiliary direct current which influences the excitation of the machine may be produced by a device which is fed by the potential of an auxiliary generator coupled, excited, or in any other manner controlled by the machine to be regulated. An auxiliary alternating current, the frequency of which is dependent upon the rotation of the speed of the machine to be regulated may, in accordance with our invention, feed one or more frequency dependent impedance arrangements including rectifiers, the latter elements producing an auxiliary direct current which is conducted through an auxiliary field coil of the machine, to control the field excitation and thus the speed of the machine to be regulated.

A broad object of our invention is to provide a substantially constant speed for a rotating electric machine such as, for example, a motor.

A more specific object of our invention is to provide a substantially constant speed for rotating electric machines, such as, for example, a motor, by providing an auxiliary generator which is coupled, excited, or in any other manner controlled by the machine to be regulated, so as to produce an alternating current, the frequency of which is dependent upon the speed of the electric machine to be controlled, and in providing a device which will convert the alternating current into a direct current flowing in either one direction or in an opposite direction, depending upon the frequency of the alternating current, and in conducting the direct current through an auxiliary field coil of the machine to compensate for speed variations thereof from a predetermined value.

Another object of our invention is to provide a simple, inexpensive and reliable control for keeping a rotating electric machine at a constant speed.

Other objects and advantages will become more readily apparent from a study of the following specification when considered in conjunction with the accompanying drawing, in which.

Figure 1:
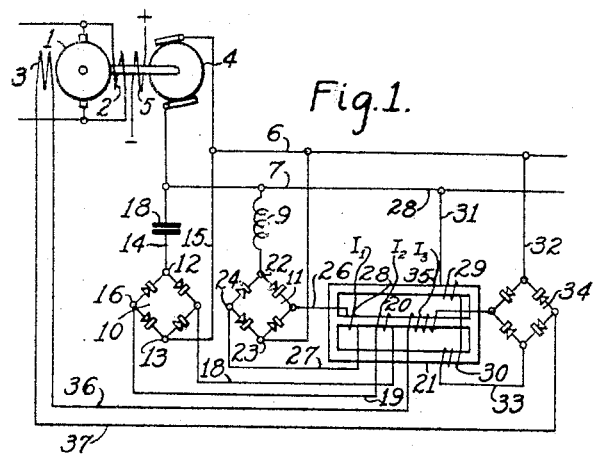
Figure 1 is a control system embodying our invention.

Referring to Fig. 1, numeral 1 indicates an electric machine, such as, for example, a motor, having a field coil 2 and an auxiliary field coil 3. Mechanically coupled to the motor 1 is an alternating current generator 4 having a field coil 5. Connected to generator 4 are conductors 6 and 7 which feed a capacitor 8 and an inductance 9, through rectifiers 10 and 11. The input terminals 12 and 13 of rectifier 10 are connected in series with generator 4 by conductors 14 and 15. The output terminals 16 and 17 of rectifier 10 are connected by conductors 18 and 19 to a coil 20 which is wound on the center leg of a three-legged magnetic core 21. Likewise, the input terminals 22 and 23 of rectifier 11 are connected in series with the inductance 9 and generator. The output terminals 24 and 25 are connected by conductors 26 and 27 to coil 28, which is also wound on the middle leg of core 21, but is wound reversely from coil 20. A pair of reversely wound coils 29 and 30 are wound on the outer legs of core 21 and are connected through conductors 31, 32 and 33 to the input terminals of the rectifier 34. The output terminals of rectifier 34 are connected in series with the auxiliary field coil 3 and the coil 35, the latter being also wound on the middle leg of core 21.

The operation of the control system in Fig. 1 is as follows: Generator 4 being coupled to motor 1, produces an alternating current of a frequency which is proportional to the speed of motor 1. This alternating current is fed into capacitor 8 and inductance 9 and through rectifiers 10 and 11 is rectified, producing a direct current $I_2$ in coil 20 and a direct current $I_1$ in coil 28, respectively. Inasmuch as coils 20 and 28 are reversely wound, they will produce fluxes in opposite directions.

Therefore, the total flux produced will be proportional to the difference of currents $I_1$ and $I_2$. This flux changes the impedance of the core and changes the value of the alternating current in coils 29 and 30 which is rectified by a rectifier 34, resulting in a direct current $I_3$ which is fed through coil 35 to effect further control of the character of regenerative coupling. Current $I_3$ is conducted through auxiliary field coil 3 to conductors 36 and 37. Inasmuch as the inductive reactance of inductance coil 9 increases with increase of frequency, and the capacitive reactance of capacitor 8 decreases with increase of frequency, there will be a particular frequency which corresponds to the particular speed desired of motor 1 at which the reactance of the circuit containing inductance coil 9 will equal the reactance of the circuit containing capacitor 8, thus current $I_1$ will equal current $I_2$, therefore, no flux will be produced and there will be no current $I_3$. If the speed of motor 1 increases beyond a predetermined desired value, the inductive reactance of coil 9 will increase while the capacitive reactance of coil 8 will decrease. Therefore, current $I_2$ will be greater than current $I_1$, thus producing a flux which, in turn, tends to saturate the core and increases the alternating current in windings 29 and 30 which is rectified through rectifier 34, producing a resultant current $I_3$ which is conducted through field coil 3, increasing the energization of the field of motor 1 so as to reduce the motor speed to a predetermined value. Likewise, it will readily be seen that if the speed of the motor 1 decreases below a predetermined value, there will result a current $I_3$ through field coil 3 which will tend to decrease the alternating current in windings 29 and 30, thus decreasing the energization of the motor to increase the speed of motor 1 up to a predetermined value.

To suppress variation of the rectifiers due to a difference in their temperatures and to suppress harmonics in the generator alterating current potential, a control system may be devised so as to produce a frequency dependent potential which is as large as possible.

Figure 3:
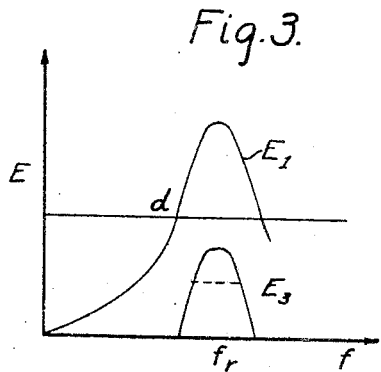
Fig. 3 shows a plurality of curves illustrating certain characteristics in the operation of the control system in Fig. 2.
Figure 2:
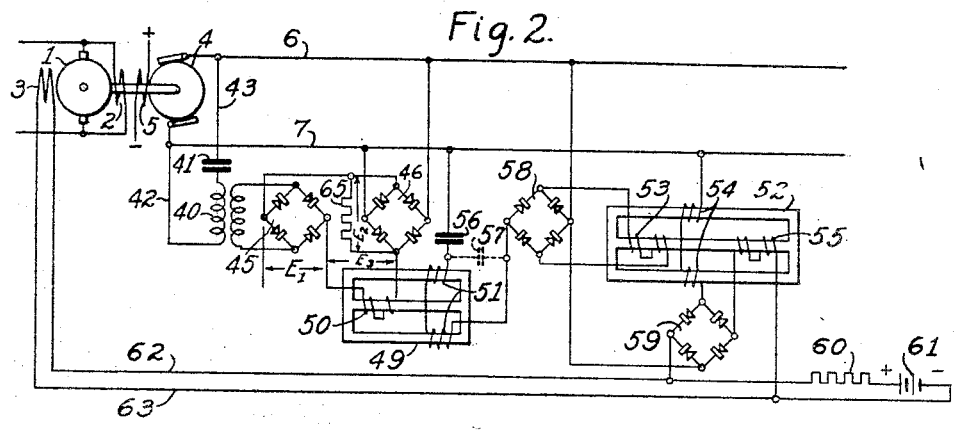
Fig. 2 is a modification of a control system embodying our invention.

Fig. 2 shows such a control system which provides a large frequency dependent potential due particularly to the resonant circuit which includes inductance coil 40 and condenser 41 connected in series with the generator 4 through conductors 42 and 43. Inasmuch as elements 1 to 7, inclusive, of Fig. 2 are exactly the same as elements 1 to 7 of Fig. 1, further description of them is deemed unnecessary. In a secondary coil 44, a potential is induced from the primary resonant circuit and is rectified through a rectifier 45 across the output terminals of which is produced a potential $E_1$. The input terminals of rectifier 46 are connected to the generator terminals 6 and 7 through conductors 47 and 48 and the output terminals furnish a potential $E_2$ across resistance 65. Fig. 3 shows a graph of voltage versus frequency of potentials $E_1$ and $E_2$, as shown. $E_3$ represents the difference of potential $E_1$ and $E_2$, it being noted at point $d$ (Fig. 3) $E_3$ is equal to zero and within a predetermined range, the value of $E_3$ increases very rapidly with increase of frequency and reaches a peak at resonance frequency (represented by $f_r$), and decreases very rapidly with an increase in frequency immediately above resonance frequency. It is this difference of potenance $E_3$ which controls an intermediate amplifier comprising two iron core transformers, the first of which is represented by numeral 49, having an input coil 50 and output coils 51, and the second of which is represented by numeral 52 having an input coil 53, output coil 54 and a regenerative coil 55. The amplification of the first iron core transformer 49 may be improved by a series condenser 56 or by a parallel condenser shown in dotted lines 57. Because of increased direct current magnetization, the inductance of the transformer 50 decreases. A series condenser 56 effects larger current absorption in the secondary coil, whereas the parallel condenser 57 increases the regulating range. The output of coils 51, condenser 56, and the alternating current generator 4 are all connected in series with the input terminals of rectifier 58, the output terminals of which are connected to coil 53. The input terminals of rectifier 59 are connected in series with the secondary coils 54 and the generator 4, whereas the output terminals of rectifier 59 are connected in series with the resistor 60 and a direct current potential source 61, which potential source serves to excite the motor winding 3 through conductors 62 and 63.

In the operation of the embodiment shown in Fig. 2, it will be seen that when the circuit 40 to 43, inclusive, is at resonance, the voltage and current will be in phase and the largest value of secondary voltage in coil 44 will be obtained. As the frequency increases above the value of resonance, that is, above $f_r$, the impressed voltage rapidly decreases, whereas, as the frequency increases up to the resonance value, the impressed voltage $E_1$ rapidly increases. Hence, it will readily be seen that the resultant voltage $E_3$, which corresponds very much to the input voltage $E_1$, acts the same way. Hence a voltage either rapidly increases or rapidly decreases in coil 50. For satisfactory control the frequency range must be restricted to either the ascending or the descending portion of curve $E_3$, normal frequency being at some intermediate point such as indicated by the dotted lines. Thus a current will be either increased or decreased in secondary coil 51. The alternating current in coil 51 is rectified by rectifier 58 and is applied to the iron core transformer 52 which acts as an amplifier and the output of which is rectified by rectifier 59 and is conducted through regenerative coil 55 and is finally passed through conductors 62 and 63 and field coil 3 so as to restore the speed of motor 1 to a normal predetermined value.

Figure 4:
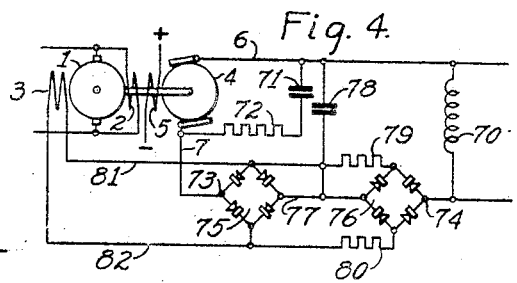
Fig. 4 is a further modification of a control system embodying our invention.
Figure 6:
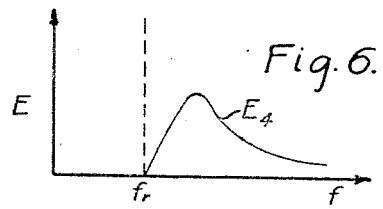
Fig. 6 shows a curve illustrating the characteristics in the operation of the control system in Fig. 4.

Fig. 4 shows another modification of the invention, including an impedance and frequency bridge, by which the sensitivity is increased and the disturbing potentials, produced by variable rectifiers, are decreased. Numerals 1 to 7, inclusive, indicate the same elements as in Figs. 1 and 2. In series with the generator terminals 6 and 7, there is a parallel resonant circuit including inductance 70 and capacitor 71 including a resistance 72 in series with the condenser 71. For resonance, the potential of inductance 70 is in phase with the potential of resistor 72 so that between points 73 and 74, the alternating current potential is zero. Interconnecting the other input terminals of rectifiers 75 and 76 is conductor 77, to which is connected another condenser 78, the other side of which condenser is connected to generator terminal 6. The output of rectifier 76, through resistances 79 and 80, are connected to winding 3 through conductors 81 and 82. In case of resonance, it is seen that there is no potential between points 73 and 74. The condenser current of condenser 78 distributes itself uniformly on the two rectifiers so that between conductors 81 and 82 the direct current potential is zero. If the frequency departs from its resonance value $f_r$, a frequency dependent direct current potential of a large value is obtained corresponding to the curve $E_4$ in Fig. 6.

Figure 5:
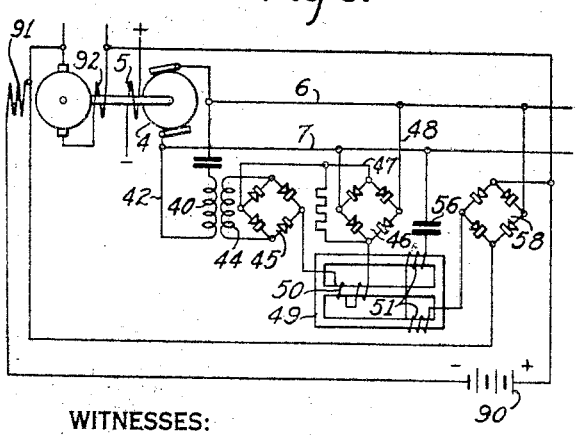
Fig. 5 is a still further modification of a control system embodying our invention.

Fig. 5 is another modification which corresponds exactly to Fig. 2 in every respect (therefore identical reference numerals indicate identical parts) except that the output of rectifier 58 instead of being connected to an amplifier, such as transformer 52 of Fig. 2, is connected in series with a source of potential 90 and a winding 91, it being noted now that the motor 1 is a compound motor having compound winding 91 and 92. By the use of a compound motor, the number of the rectifiers may be diminished, thereby conserving space, which is advantageous in certain installations, such as on ships where the space is limited and room temperatures may run very high.

It is, of course, understood that any other conventional amplifier may be substituted for those in the invention. It is also understood, of course, that that current in conductors 81—82 in Fig. 4 may be amplified before being conducted through winding 3.

We are, of course, aware that others, particularly after having had the benefit of the teachings of our invention, may devise other systems embodying the principles of our invention, therefore, we do not wish to be limited to the specific showing made in the drawing and the descriptive disclosure hereinbefore made, but wish to be limited only by the scope of the appended claims and such prior art as may be pertinent.

We claim as our invention:

1. In a speed control system, in combination, an electric rotary machine including a field coil, an alternating current generator which is synchronously connected to said machine and which thereby produces an alternating current whose frequency is proportional to the speed of the machine, a transformer comprising a core of magnetic material and four coils wound thereon, a condenser, and a rectifier, the latter having input and output terminals, said condenser being connected in series with said rectifier input terminals, and said generator and the first of said coils being connected across said rectifier output terminals, an inductance, and a second rectifier having input and output terminals, said inductance and said second rectifier input terminals being connected in series with said generator, and the second of said coils being wound in opposition to the first of said coils and being connected across the output terminals of said second rectifier, said condenser-rectifier input combination being connected in parallel with said inductance-rectifier input combination and in parallel with said generator, a third rectifier having input and output terminals, the input terminals of which are connected in series with the third of said coils and said generator, and the output terminals of which are connected in series with said motor field coil and with the fourth of said coils wound on said transformer for securing regenerative coupling and for compensating the said machine against variations in speed.

2. In a speed control system, in combination, an electric motor, an alternating current generator which is synchronously connected thereto and which thereby produces an alternating current whose frequency is proportional to the speed of said machine, a saturable reactor core having a pair of reversely wound input coils wound thereon, two parallel circuits connected across such pair of terminals of said generator, one circuit including an inductance, a rectifier and one of said input coils and the other circuit including a condenser, a rectifier and the other of said input coils for producing a magnetomotive force in said core in one direction proportional to the difference of current flow through said input coils when the speed of the machine is above a predetermined value and a magnetomotive force in an opposite direction when the speed of the machine is below a predetermined value, an output winding also on said choke for producing a current proportional to the difference of the currents in said input windings, a regenerative winding also on said core and a field coil on said machine for governing the speed thereof which field coil is fed by said output winding current in addition to current from said regenerative winding to compensate for the variation in the speed of the machine and to restore said speed to a predetermined value.

3. In a speed control system, in combination, an electric motor, an alternating current generator which is synchronously connected thereto and which thereby produces an alternating current whose frequency is proportional to the speed of the motor, a saturable reactor having a pair of reversely wound input coils, two parallel circuits connected across a pair of terminals of said generator, one circuit including an inductance, a rectifier and one of said input coils, serially connected, and the other circuit including a condenser, a rectifier and the other of said input coils serially connected, for producing a magnetomotive force in said core in one direction proportional to the difference of current flow through said input coils when the speed of the motor is above a predetermined value and a magnetomotive force in an opposite direction when the speed of the motor is below a predetermined value, an output winding also on said choke and a third rectifier whose input is connected in series with said output winding and generator for producing a current proportional to the difference of the currents on said input windings, and a control field coil on said motor for governing the speed thereof which control field coil is fed by said output winding through the output of said third rectifier thereby furnishing direct current to compensate for the variation in the speed of the motor and to restore said speed to a predetermined value, electromagnetic amplifying means wound on said core for effecting amplification and regeneration of said direct current.

WILHELM LAUBENHEIMER.
OSKAR SCHMUTZ.